United States Patent [19]
Klimaszewski, Jr.

[11] 3,929,943
[45] Dec. 30, 1975

[54] PROCESS FOR SEALING THERMOPLASTIC TUBE

[75] Inventor: Charles Stanley Klimaszewski, Jr., Wilmington, Del.

[73] Assignee: E. I. Du Pont de Nemours & Company, Wilmington, Del.

[22] Filed: Aug. 28, 1974

[21] Appl. No.: 501,458

Related U.S. Application Data

[63] Continuation-in-part of Ser. No. 299,095, Oct. 19, 1972, abandoned.

[52] U.S. Cl. ............... 264/25; 264/320; 264/322
[51] Int. Cl.² ................................ B29D 23/01
[58] Field of Search.................. 264/25, 320, 322

[56] References Cited
UNITED STATES PATENTS

| | | | |
|---|---|---|---|
| 2,285,980 | 6/1942 | Jeckel | 264/322 |
| 2,792,593 | 5/1957 | Hardgrove | 425/384 |
| 2,876,496 | 3/1959 | Murphy | 264/322 |
| 2,900,665 | 8/1959 | Walker | 264/25 |
| 3,013,925 | 12/1961 | Larsen | 264/322 X |
| 3,390,442 | 7/1968 | Sosnowski | 264/25 X |

*Primary Examiner*—Richard R. Kucia

[57] ABSTRACT

A process for sealing an open end of a hollow, cylindrical, thermoplastic tube comprising:
a. providing a circumferential beveled edge on the open end of the tube,
b. rapidly heating the beveled open end of the tube to its melting temperature,
c. pressing the beveled open end of the tube into a mold to force the beveled edges together and seal the open end, and
d. rapidly cooling the sealed tube.

Polyethylene terephthalate tubes sealed by the process have particular utility as preforms in the blow-molding of containers.

3 Claims, 9 Drawing Figures

STATION 1  STATION 2

STATION 1  STATION 2

PROCESS FOR SEALING THERMOPLASTIC TUBE

CROSS REFERENCE TO RELATED APPLICATIONS

This application is a continuation-in-part of copending application Ser. No. 299,095, filed on Oct. 19, 1972, now abandoned for Sealed Thermoplastic Slugs.

BACKGROUND OF THE INVENTION

This application relates to a process for sealing the open end of a hollow, thermoplastic tube and, in a preferred embodiment, relates to a process for sealing the open end of a hollow polyethylene terephthalate tube which is suited for subsequent use as a slug or preform in the manufacture of containers.

Recently issued U.S. Pat. No. 3,733,309 to Wyeth et al. discloses a method for making a container, such as a bottle, by extruding, drawing and inflating a thermoplastic tube. When an open-ended tube is used in the process, an additional process step is required to seal the bottom of the container. One way of streamlining this method is by using a tube having a closed end and extruding the tube open end first. In this case, extrusion of the tube is terminated before the closed end is extruded, thereby leaving the closed end intact to form the bottom of the container.

Another method of forming plastic containers is by heating a thermoplastic tube, preferably to its orientation temperature, placing the tube in a mold, and inflating the tube to contact the mold walls. This method is most conveniently carried out with a tube having a closed end which becomes the bottom of the container.

Thermoplastic tubes for the manufacture of containers are conventionally manufactured in one of two ways. First, the thermoplastic polymer may be extruded through an annular die opening to form a hollow tube having both ends open; and, second, molten thermoplastic polymer may be injected into a mold cavity which defines a tube having one or both ends open. In either case where the tube has both ends open, it is necessary to subsequently close one of the open ends when a closed-end preform is desired.

Unfortunately, it is extremely difficult, especially in the case of polyethylene terephthalate tubes having thick walls, to adequately seal an open tube end by conventional techniques to prepare a slug which will not leak and which is suited for the manufacture of containers. Thus, there is a need for a convenient and easy method for sealing one end of an open thermoplastic tube to prepare slugs for the manufacture of containers.

SUMMARY OF THE INVENTION

Accordingly, the present invention provides a process for sealing an open end of a hollow, cylindrical, thermoplastic tube comprising:
a. providing a circumferential beveled edge on an open end of the tube,
b. rapidly heating the beveled open end of the tube to its melting temperature,
c. pressing the beveled open end of the tube into a mold to force the beveled edges together and seal the open end, and
d. rapidly cooling the sealed tube.

The process can be used to seal thermoplastic tubes in general, including, but not limited to, tubes of alpha-monoolefin polymers having at least 2 to 8 carbon atoms such as ethylene, propylene, and butene and blends thereof; copolymers of acrylonitrile/styrene, acrylonitrile/styrene/acrylate, acrylonitrile/methacrylate, methacrylonitrile copolymers; polycarbonates; polyamides, polyformaldehyde; polyesters; and polyvinyl chloride.

The process has special utility, however, when used to seal relatively thick-walled tubes of polyethylene terephthalate which, when not beveled, have a marked tendency to crystallize and develop leaks during the sealing operation, and the process will hereinafter be described as applied to polyethylene terephthalate tubes.

DETAILS OF THE INVENTION

Figure 1:
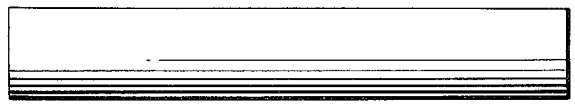
FIG. 1 shows a side view of a slug having an inside circumferential bevel at one end of the slug.

Polyethylene terephthalate has received recent mention as a preferred thermoplastic candidate for the manufacture of containers since, when oriented during manufacture of the containers, it exhibits excellent strength properties, creep resistance, and a low permeation factor, particularly with respect to carbon dioxide, oxygen, water vapor, and FREON (Trademark of E. I. du Pont de Nemours & Company) vapors, making it excellently suited for use as a container for liquids bottled under pressure, such as sodas, beer, or aerosols.

When forming with polyethylene terephthalate, it is advantageous to start with essentially amorphous material, i.e., crystallinity no greater than about 5%, in order to produce a clear end product. Useful polyethylene terephthalate polymers have an inherent viscosity (1% concentration of polymer in a 37.5/62.5 weight percent solution of tetrachloroethane/phenol, respectively, at 30°C.) of at least about 0.55. Preferably, the inherent viscosity is at least about 0.7, because this produces a bottle having significantly improved toughness properties, e.g., increased impact resistance. Typically, slugs are made wherein the viscosity is 0.85, 0.95, and even up to values above 1.0. If it is intended that the end product be colored, it is convenient to add the coloring agent such as a dye or pigment to the polymer used to form the slug and, of course, result in a colored slug.

The open end of the polyethylene terephthalate tubes to be sealed in practicing the invention are provided with a circumferential beveled edge. The beveled tubes can conveniently be prepared by extruding the polymer through an annular die orifice, cutting the tubes to the desired length, and thereafter beveling an open end using a machine suited for that purpose. Alternatively, the beveled tubes can be prepared by injection molding of polymer into a mold cavity which defines a beveled tube, or by injection molding a tube which is thereafter beveled. Beveling may be accomplished by any convenient method, such as cutting or abrading.

Beveling not only removes excess material which would otherwise have to be shaped during the sealing process, but also provides the tube with a tapered area which can be effectively sealed without introducing crystallinity. Not being bound by theory, it is believed that beveling reduces the quantity of material in the area of sealing to a quantity which can rapidly be heated to a highly molten state without developing crystallinity.

The tendency of polyethylene terephthalate to crystallize during heating depends on the polymer inherent viscosity, the temperature and time of exposure, and the polymer heat history. In general, however, the tendency of polyethylene terephthalate to crystallize is especially evident in the range of about 130° to 200°C., with exposure times as short as about 6 seconds inducing crystal formation within the range. Since the temperature of polyethylene terephthalate whereat sealing is accomplished is about 275°C., it is necessary that the polymer be rapidly heated to that temperature.

Since polyethylene terephthalate has a low heat transfer coefficient, conduction of heat within the tube is slow and, in square-ended tubes, the tendency of the polymer to crystallize becomes more acute as the wall thickness and tube diameter increase. For instance, it has been found that square-ended tubes tend to have an unacceptable degree of crystallinity after heating to the sealing temperature in the cases of (1) 1.38-inch O.D. tubes having wall thicknesses greater than about 125 mils, and (2) 0.685-inch O.D. tubes having wall thicknesses greater than about 110 mils. It will be appreciated that unacceptable degrees of crystallinity not only cause the polymer to change from a clear to a milky color, but also embrittle the tube and make subsequent biaxial orientation during the manufacture of containers therefrom much more difficult.

Also, through beveling, those portions of the tube material which form the seal are at or near the surface and can readily be brought to a uniform molten state. Thus, when the tube ends are subsequently pressed together, all areas in contact are at the proper sealing temperature and a reliable seal is obtained. Beveling thus makes it possible to use localized heating, rapidly raising the material forming the seal to the melt temperature while minimizing the temperature attained by other portions of the tube, thereby minimizing crystallization.

Figure 2:
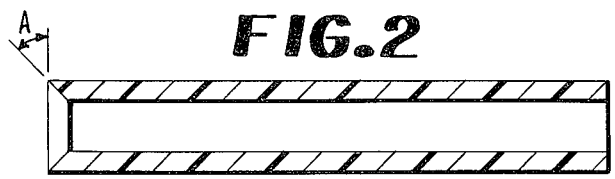
FIG. 2 is a cross section of FIG. 1.
Figure 3:
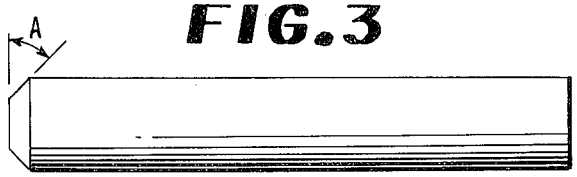
FIG. 3 is a side view of a slug having an outside circumferential bevel at one end of the slug.
Figure 4:
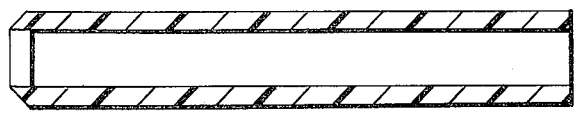
FIG. 4 is a cross section of the slug shown in FIG. 3.
Figure 5:
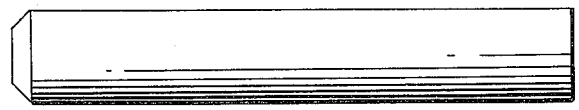
FIG. 5 is a side view of a slug having an inside and an outside circumferential bevel at one end of the slug.
Figure 6:
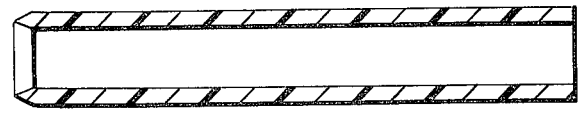
FIG. 6 is a cross section of the slug shown in FIG. 5.

The tube can be beveled on the inside as shown in FIGS. 1 and 2, can be beveled on the outside as shown in FIGS. 3 and 4, or can be beveled on the inside and outside as shown in FIGS. 5 and 6. The angle of the bevel "A" as shown in the drawings is controlled by practical limitations and is preferably about 30°–60° to the plane defining the end of the slug. It is preferred that the angle of bevel be at a 45° angle to the plane defining the end of the slug. Elliptical or compound bevels can also be employed.

In sealing the beveled tube, the tube is rapidly heated to its sealing temperature using a localized heat source which preferentially heats the beveled surface. The heat source raises the temperature of the beveled surface to at least the melting temperature of about 260°C. rapidly enough to avoid undue crystallization. The surface, however, should not be heated to a temperature higher than about 315°C. to minimize any polymer degradation. Preferred surface temperatures attained during heating are within the range of about 270° to 290°C.

The speed with which the polymer must be heated to its melt temperature has been found to depend on the inherent viscosity of the polymer and the wall thickness and diameter of the tube, but can readily be determined for a particular tube by varying the heating rate and observing the degree of crystallinity and seal thereby obtained. When using a tungsten halogen light source rated at 750 W - 120 V - 500 HR, for example, it has been observed that the heating time should be less than about 10 seconds for 0.825-inch O.D. tube having a wall thickness of 150 mils made of polyethylene terephthalate having an inherent viscosity of about 0.56 and preferably about 7 to 8 seconds. In general, the maximum period for heating will be less than about 15 to 20 seconds, with the exact tolerance depending on factors hereinbefore mentioned. High-intensity radiant heaters, such as tungsten or quartz lamps, or microwave heaters such as dielectric heaters or ultrasonic heaters, can be selected to heat the beveled tube. The important feature in selecting a heat source is the need to provide rapid localized heating of the beveled portion of the tube and the need to heat the remaining portion of the tube which is deformed during the sealing temperature to a temperature at which it is pliable but below the temperature range of 130° to 200°C. wherein there is a short induction time before crystallization.

Figure 7:
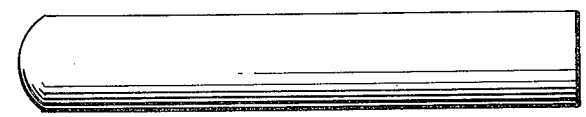
FIG. 7 is a side view of a slug wherein one end that originally had a circumferential bevel has been sealed.
Figure 8:
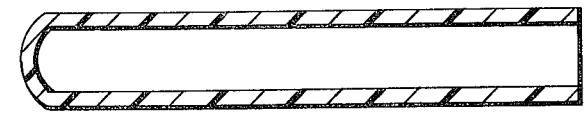
FIG. 8 is a cross section of FIG. 7.

After the beveled tube has been heated, it is pressed into a mold to force the beveled edges together and seal the open end. The sealing is conveniently accomplished by forcing an axially aligned female hemispherical mold toward a mandrel inserted in the tube and into contact with the beveled tube. The open end of the tube thereby is forced into conformity with the mold cavity defined by the mold and mandrel and the beveled edges are brought together and sealed in the shape shown in FIGS. 7 and 8.

Upon being sealed, the tube is rapidly cooled through the temperature range in which crystallinity has a short induction time; and the tube is then removed from the mandrel in the form of a slug which can be used in the manufacture of containers. Since heating of the tube is minimized in the process, external cooling of the mold or a quenching bath may not be required. If rapid repetitive cycles are desired, however, the mold may be cooled, made of aluminum, or the sealed tube may be quenched by immersion in a quenching bath after removal from the mold.

The resulting product is a hollow, thermoplastic slug having a sealed end, which slug can subsequently be blow-molded into a biaxially oriented article such as a bottle. The resulting article is formed in such a manner that the open end of the slug forms the open neck of the article and the sealed end of the slug forms the bottom of the article. If blow-molding is carried out at the orientation temperature of the polymer, the resulting article will be biaxially oriented.

Highly reliable seals are obtained when practicing the process. For instance, over 99% of containers manufactured from the closed-end slugs will exhibit no significant leakage after 100 hours at 100°F. and 100 psi. pressure, indicating that an effective seal is obtained.

Figure 9:
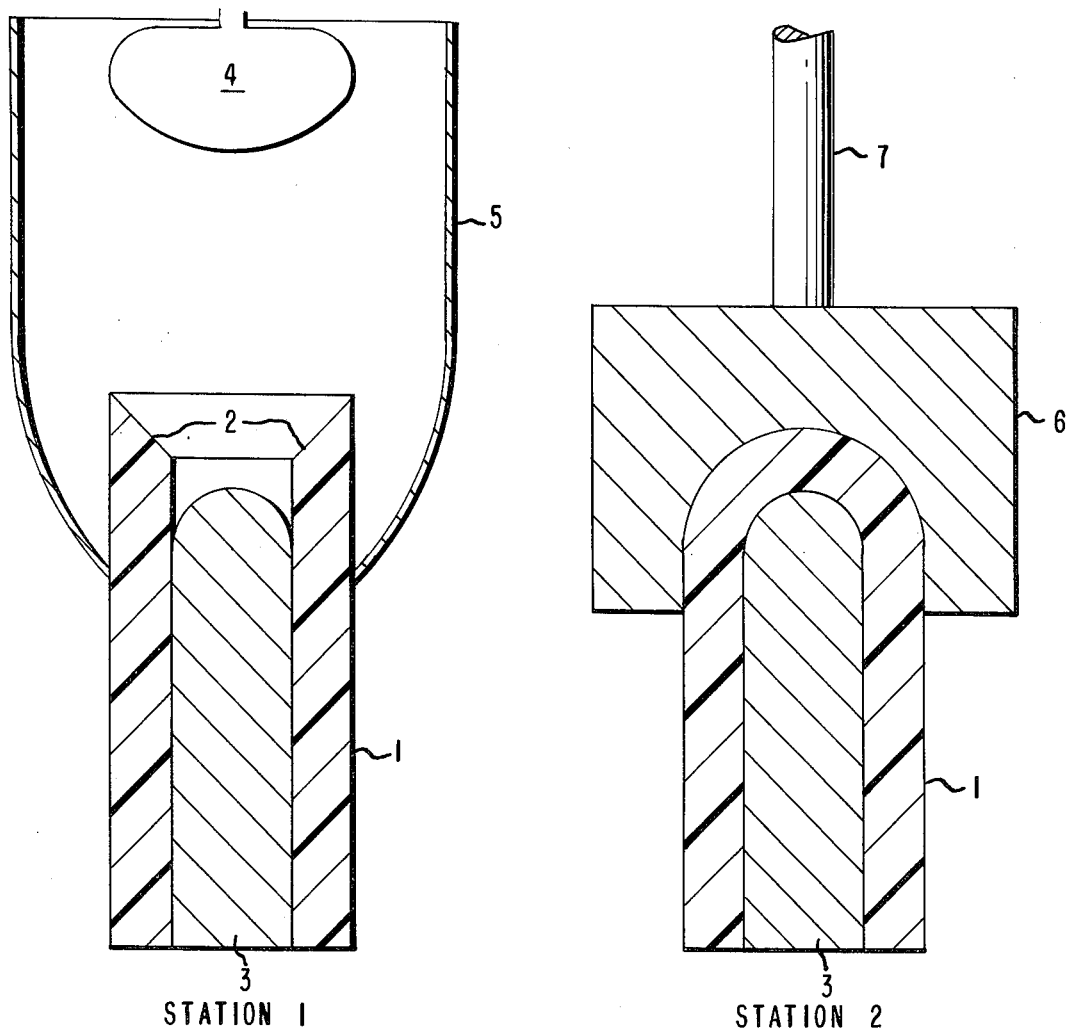
FIG. 9 is a cross section taken in elevation of apparatus useful in carrying out the process.

The invention will now be further described with reference to FIG. 9 which shows, in elevated cross-section, a two-station device for carrying out the process. The beveled edge of the tube is heated to its melt temperature at station 1 and the open end is sealed at station 2.

A polyethylene terephthalate tube 1 having a wall thickness of 150 mils, an outside diameter of 0.825 inch, an inherent viscosity of about 0.56, and an open end 2 having a 45° bevel is positioned on a mandrel 3 and placed under a heater 4. The heater is a Sylvania tungsten halogen lamp having a 750 W - 120 V - 500 HR rating. The lamp is positioned coaxial with the tube so that high intensity energy directly impinges on all portions of the beveled surface but not to any significant extent onto the side walls of the tube. A reflector 5 is provided to give indirect heating to that portion of the tube which must be softened in order to be molded at station 2. In 7 seconds, the beveled end is heated to a surface temperature of about 275°C. and the side walls reach an average surface temperature of about 100°C.

The tube, while still mounted on the mandrel, is then moved to station 2 where an aluminum female mold 6, concentrically aligned with the mandrel, is forced down by ram 7 to force the beveled end of the tube inwardly, thereby closing and sealing the tube. The mold quenches the polymer in addition to closing the tube, and the tube is removed from the mold and mandrel after 5 seconds having a temperature of about 60°C. at the sealed end.

Visual inspection of the sealed tube, which is to be used as a slug in the manufacture of containers, shows the presence of no substantial crystallinity. Bottles made from such slugs exhibited no leakage after 100 hours at 100°F. and 100 psi. pressure, indicating that an effective seal was obtained.

In contrast, slugs made from similar tubes, except that the tubes had square-cut open ends, had highly crystalline sealed ends and bottles made therefrom had a high degree of leakage, indicating that good seals were not obtained.

I claim:

1. A process for sealing an open end of a hollow, cylindrical, polyethylene terephthalate tube comprising:
   a. providing a circumferential beveled edge on the open end of the tube,
   b. locally heating the beveled open end of the tube to a surface temperature of about 260° to 315°C. in less than about 15 seconds,
   c. pressing the beveled open end of the tube into a mold to force the beveled edges together and seal the open end, and
   d. rapidly cooling the sealed tube.

2. The process of claim 1 wherein the heating is by exposure to a high-intensity radiant heater.

3. The process of claim 2 wherein the light source is a tungsten lamp.

* * * * *